United States Patent

Erickson et al.

[15] 3,697,182
[45] Oct. 10, 1972

[54] FABRY-PEROT INTERFERENCE MIRROR SEPARATION SYSTEM AND METHOD THEREFOR

[72] Inventors: Allen M. Erickson, Silver Spring; Bernard V. Kessler, Greenbelt, both of Md.

[73] Assignee: The United States of America as represented by the Secretary of the Navy

[22] Filed: July 24, 1970

[21] Appl. No.: 58,028

[52] U.S. Cl. .................................................356/112
[51] Int. Cl. ...............................................G01b 9/02
[58] Field of Search..............................356/106–113

[56] References Cited

UNITED STATES PATENTS 3,387,531  6/1968  Hesse.....................356/112 X
3,471,800  10/1969  Congleton et al......356/112 X

OTHER PUBLICATIONS

" Film Thickness Measurement for Grating Blanks," Fred McNally, JOSA, June 1953, Vol. 43, pg. 540

Primary Examiner—Ronald L. Wibert
Assistant Examiner—Conrad Clark
Attorney—R. S. Sciascia, R. J. Erickson and J. A. Cooke

[57] ABSTRACT

A Fabry-Perot interferometer is provided by vacuum depositing mirrors on two separate quartz supports, vacuum depositing a separator ring of a few wavelengths thickness on one of the mirrors, and then clamping the two mirror sections together, the separator ring thickness providing the separation between the two mirrors.

2 Claims, 7 Drawing Figures

PATENTED OCT 10 1972 3,697,182

Allen M. Erickson
Bernard V. Kessler
INVENTORS

BY J.O. Tresansky
ATTORNEY

FABRY-PEROT INTERFERENCE MIRROR SEPARATION SYSTEM AND METHOD THEREFOR

BACKGROUND OF THE INVENTION

This invention relates generally to optical interferometers, and more particularly to mirror separators utilized in Fabry-Perot interferometers.

Fabry-Perot interferometers consist of two mirrors oriented parallel to each other and spaced apart by a fixed distance determined by the wavelength of light, and the degree of optical interference desired. Since the distance between the mirrors must be accurate to a fraction of the wavelength of light, which for visible light is less than one micron, it is extremely difficult to accurately separate the mirrors. Furthermore, any change in separation produced by external phenomena, such as changes in temperature, will be sufficient to drastically change the interference characteristics of this device.

In one prior art technique for separating the mirrors, one of the mirrors is mounted in a fixed base and the second mirror is positioned by three differential screws equidistantly arranged around its periphery. By adjusting the screws, both separation and parallelism are effected. Using this technique it is difficult to achieve the desired separation and parallelism, since the three screws must be adjusted in cooperation. Additionally, thermal expansion of the screws adversely effect the separation since, as discussed hereinbefore, the separation must be accurate to a fraction of a micron.

In another prior art system the mirrors are separated by a specially ground ring of hard material with minimum thickness dependent on tolerable fracture forces. Since the minimum thickness of these rings is perhaps one thirty-second of an inch, thermal expansion adversely affects the separation and the interference characteristics.

Still other mounting systems are made by depositing the mirrors on opposite surfaces of an etalon wherein the etalon thickness determines the mirror spacing. Here too, thermal expansion adversely effects separation and interference characteristics.

Additionally, both the ground ring separator and the etalon systems are expensive to produce since it is very difficult to achieve the desired thickness by machine grinding. Typically, for example, several ground rings will be produced and tested by trial and error to determine which, if any, have the desired interference separation. Also, these systems are not rugged, since any slight movement will change the mirror separation.

Finally, prior art mirror separators are incapable of producing very small spacings, of perhaps a few wavelengths, which may be desirable in some applications. For example, mode separation increases as the mirror separation becomes smaller. Thus, very wide mode separation can be achieved if the mirrors are separated by only a few wavelengths. Clearly, neither an etalon nor a machine ground spacer ring can be made to this thickness.

SUMMARY OF THE INVENTION

Accordingly, one object of the present invention is to provide a new and improved mirror separator system for a Fabry-Perot interferometer.

Another object of the present invention is the provision of a Fabry-Perot interferometer having fixed spacing between the mirror.

Still another object of the instant invention is the provision of a Fabry-Perot interferometer having closely spaced mirrors.

A further object of this invention is the provision of a Fabry-Perot interferometer whose mirror separation is insensitive to temperature variations.

A still further object of the instant invention is the provision of an inexpensive and rugged Fabry-Perot interferometer.

Another still further object of the instant invention is to provide a new and improved method of making Fabry-Perot interferometers.

Briefly, in accordance with one embodiment of this invention, these and other objects are achieved by providing a Fabry-Perot interferometer having two mirrors vacuum deposited on separate supporting members, and a ring separator vacuum deposited on one mirror. The two mirror sections are then clamped together so that the separation between mirrors is provided by the vacuum deposited separator ring.

In an alternate embodiment, a conventional mounting ring is vacuum deposited with separator material and the resulting separator ring is clamped between the two mirror sections, providing a large spaced Fabry-Perot interferometer.

DESCRIPTION OF THE PREFERRED EMBODIMENTS

Figure 1:
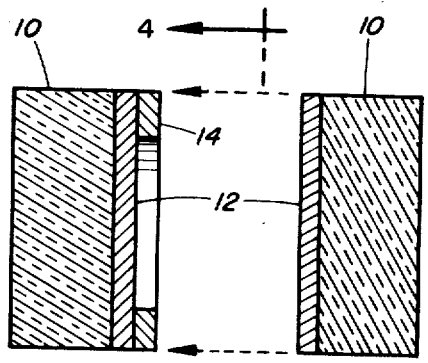
FIG. 1 is a cross-sectional view of a closely spaced interferometer prior to clamping the two mirror sections together.
Figure 4:
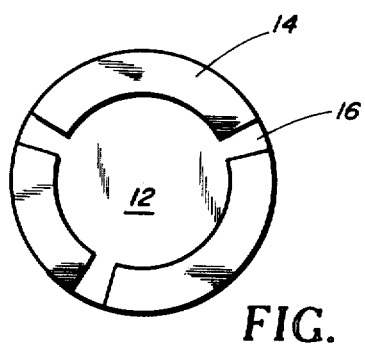
FIG. 4 is a view of the interferometer of FIG. 1 along line 4—4.
Figure 3:
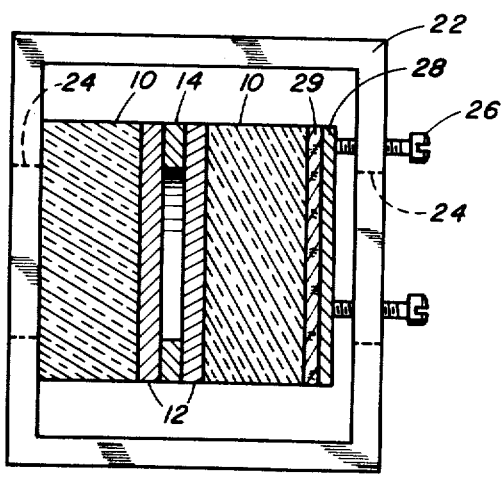
FIG. 3 is a cross-sectional view of one embodiment of a closely spaced interferometer with the two mirror sections clamped together.
Figure 2:
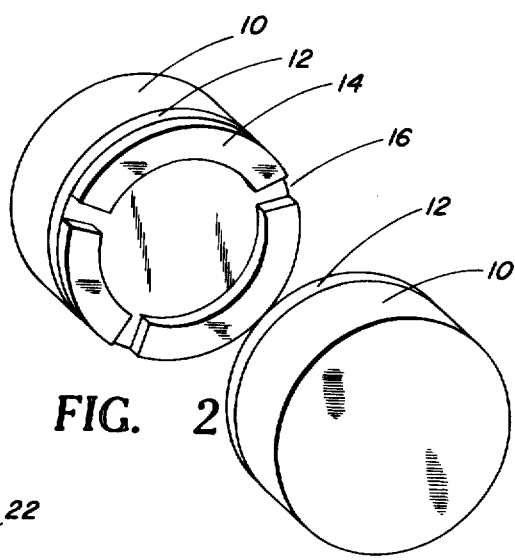
FIG. 2 is a perspective view of the closely spaced interferometer with the mirror sections apart.
Figure 7:
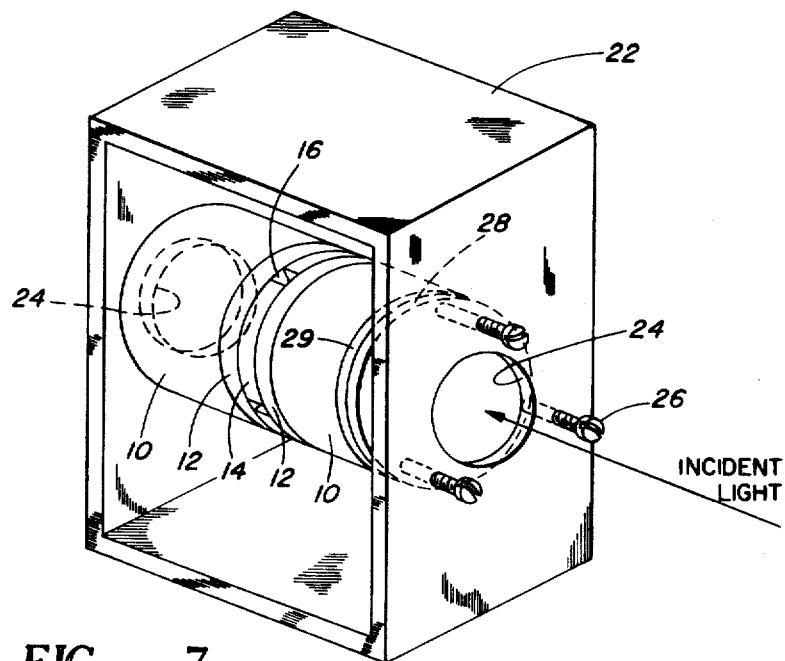
FIG. 7 is a perspective view of a closely spaced interferometer that has been clamped together.

Referring now to the drawings wherein like reference characters designate identical or corresponding parts throughout the several views, and more particularly to FIG. 1 thereof wherein the interference mirror separator of the present invention is shown as consisting of mirror supports 10, dielectric mirrors 12, and dielectric separator ring 14. As shown more clearly in FIG. 2, mirror supports 10 are cylindrical blocks, typically made of optically transparent quartz or optical glass having both faces of each support polished flat. On one face of each support a conventional optically flat dielectric mirror 12 is vacuum deposited, the reflectivity being dependent upon the particular application for which the optical interference system is to be used. After the dielectric mirrors 12 have been deposited, dielectric separator ring 14, which may consist of silicon dioxide for example, is vacuum deposited on one of the dielectric mirrors 12. As shown more clearly in FIGs. 2 and 4, separator ring 14 consist of three separate identical circular segments that are arranged around the periphery of mirror 12. Between each segment is a small air space 16. The separator ring segments are vacuum deposited through an appropriately shaped mask, not not shown, to a thickness on the order of a few wavelengths of light, for example less than 100,000 A, representing the desired separation between two mirrors of a closely spaced interferometer, such as may be employed in the laser Q-switch of Patent application Ser. No. 612,301, filed Jan. 26, 1967. The two supports 10 are then clamped together so that mirrors 12 are facing each other in parallelism, but are spaced apart by separator ring 14, as shown in FIGS. 3 and 7. Air spaces 16 provide escape outlets to prevent air pressure from building up between the mirrors that could move the mirrors out of parallelism or change the optical path length between the mirrors.

A conventional clamping arrangement is shown in FIGS. 3 and 7. The two mirror supports 10 are placed in a box clamp 22 which has openings 24 at each end for incident light to pass through. Three point screw pressure is applied by screws 26 to a metal ring 28 and cork ring 29 on the back of one of the mirror supports 10 that evenly distributes the pressure. This pressure keeps the mirrors 12 pressed firmly against separator ring 14, thereby ensuring that the mating mirror remain in contact with the separator ring 14. Screws 26 are adjusted to obtain optical parallelism between mirrors 12.

The separator ring deposition technique of the instant invention enables precise separation of the interference mirrors to the desired optical distance. For example, it is frequently desirable to have an interferometer with mirrors spaced apart by $N\lambda/2$, Ser. No. 612,301, where $n$ is odd, to thereby produce minimum reflection of light of wavelength $\lambda$ incident normal to the interferometer mirrors. Visible light has wavelengths in the range 4,000 to 7,700 A. Thus, $\lambda/2$ ranges from 2,000 to 3,850 A, and an interferometer would need its mirrors spaced by an odd multiple of these lengths. Vacuum deposition of the separator 14 can be controlled to within a few angstroms using well known techniques. Consequently, a high degree of accuracy in mirror spacing is readily obtained.

Since the apparatus of the present invention employs only a few wavelengths of separator material, even those with poor thermal coefficients have essentially no effect on mirror separation. For example, a silicone dioxide separation ring of 30,000 A with a thermal coefficient of $9 \times 10^{-6}$ units/unit/degree centigrade, will change in thickness over a 30° C. temperature differential only 8.1 A, roughly 0.2 percent of the total wavelength.

Figure 5:
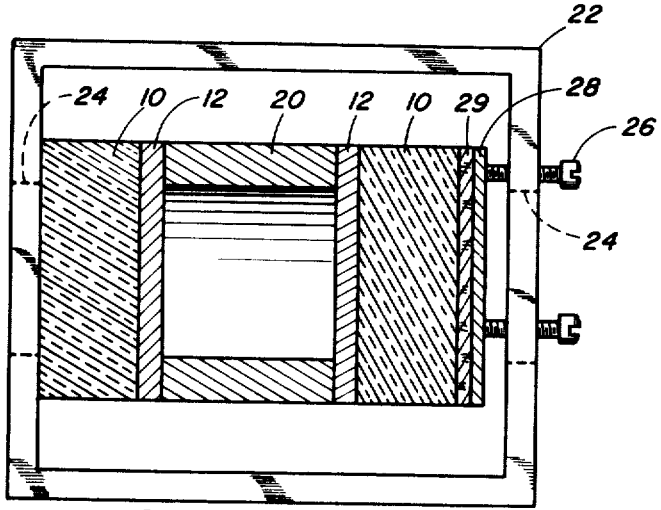
FIG. 5 is a cross-sectional view of a prior art large spaced interferometer with both mirror sections separated by a mounting ring.
Figure 6:
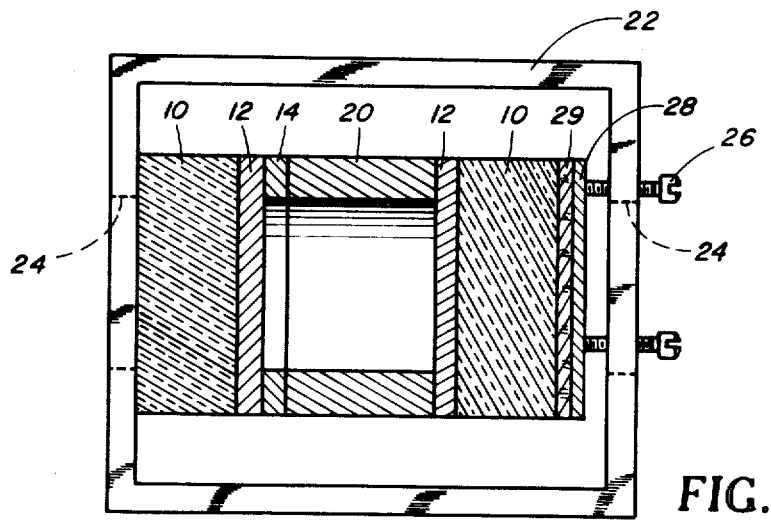
FIG. 6 is a cross-sectional view of an alternative embodiment of a large spaced interferometer with the two mirror sections separated by a mounting ring and separator ring.

An alternate embodiment of the present invention is illustrated in FIG. 6, wherein an interferometer with large spacing is shown clamped together as described herein before with respect to FIG. 3 and 7. In this embodiment a detachable mounting ring 20, which may, for example, be ⅛ inch thick, is initially positioned between mirrors 12 as shown in the prior art embodiment of FIG. 5 to determine if there is any error in its thickness. This is achieved by measuring the reflectivity of the interferometer. Thus, if it is desired that the mirrors be separated by an odd number of half wavelengths, the reflectivity should be minimal. Any error in thickness will produce higher reflectivity which, if measured, will determine the error in thickness. The mounting ring 20 is then removed and vacuum deposited with spacer material at one end to the appropriate thickness and the large spacing interferometer is reassembled, as shown in FIG. 6. It should be noted that the mounting ring 20 is vacuum deposited with spacer material around the entire periphery, since the mounting ring will typically have its own air bleed-off vent to prevent air pressure on the mirror faces. It should also be noted that this embodiment does not include full thermal correction because of the addition of the extra separator material in mounting ring 20.

It will be apparent that the method and apparatus of the herein described interference mirror separator achieves accurate mirror spacing. Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An interference mirror separator system, comprising:

a pair of mirror supports;

a pair of optically flat mirrors, each mirror being vacuum deposited to an individual one of said mirror supports;

a separator ring having air spaces vacuum deposited on one of said mirrors for separating said mirrors, wherein the thickness of said separator ring is less than 100,000 A; and means for aligning said mirrors in parallelism and for clamping said mirrors supports together with said mirrors facing each other, whereby said mirrors are separated only by said separator ring.

2. An interference mirror separator system, comprising:

A pair of mirror supports;

a pair of optically flat mirrors, each mirror being vacuum deposited to an individual one of said mirror supports;

a mounting ring;

a separator ring of less than 100,000 A thickness having air spaces vacuum deposited on one end of said mounting ring; and means for aligning said mirrors in parallelism and for clamping said mirror supports together with said mounting ring and said separator ring positioned between said mirrors and with said mirrors facing each other, whereby said mirrors are separated only by said mounting ring and said separator ring.

* * * * *